US007440519B2

(12) United States Patent
Li et al.

(10) Patent No.: US 7,440,519 B2
(45) Date of Patent: Oct. 21, 2008

(54) ALGORITHM FOR MULTIPLE-SYMBOL DIFFERENTIAL DETECTION

(75) Inventors: Bin Li, Ronkonkoma, NY (US); Robert A. DiFazio, Greenlawn, NY (US); Donald M. Grieco, Manhassett, NY (US); Ariela Zeira, Huntington, NY (US)

(73) Assignee: Interdigital Technology Corporation, Wilmington, DE (US)

( * ) Notice: Subject to any disclaimer, the term of this patent is extended or adjusted under 35 U.S.C. 154(b) by 478 days.

(21) Appl. No.: 11/015,220

(22) Filed: Dec. 17, 2004

(65) Prior Publication Data

US 2005/0105652 A1 May 19, 2005

Related U.S. Application Data

(63) Continuation of application No. 10/279,238, filed on Oct. 24, 2002, now Pat. No. 6,842,496.

(51) Int. Cl.
*H03D 3/22* (2006.01)
(52) U.S. Cl. ...................................... 375/329
(58) Field of Classification Search ................ 375/329, 375/262, 341
See application file for complete search history.

(56) References Cited

U.S. PATENT DOCUMENTS

| 5,644,592 A | 7/1997 | Divsalvor et al. |
| 5,684,832 A | 11/1997 | Adachi et al. |
| 5,786,725 A | 7/1998 | Boccuzzi et al. |
| 6,088,411 A | 7/2000 | Powierski et al. |

| 6,922,438 B1 * | 7/2005 | Eidson ........................ 375/224 |

FOREIGN PATENT DOCUMENTS

| EP | 1134946 | 9/2001 |
| JP | 06237280 | 8/1994 |
| JP | 06311195 | 11/1994 |
| JP | 2000268147 | 3/2002 |
| TW | 444471 | 7/2001 |
| TW | 457376 | 10/2001 |
| WO | 98/20630 | 5/1998 |

OTHER PUBLICATIONS

B. Li et al., "Multiple-Symbol Detection for Orthogonal Modulation in CDMA System," IEEE Transactions on Vehicular Technology, vol. 50, No. 1, Jan 2001, pp. 321-235.
D. Divsalar et al., "Multiple-Symbol Differential Detection of MPSK," IEEE Transactions on Communications, vol. 38, No. 3, Mar. 1990, pp. 300-308.

(Continued)

*Primary Examiner*—Khai Tran
(74) *Attorney, Agent, or Firm*—Volpe and Koenig, P.C.

(57) ABSTRACT

A method for differential phase evaluation of M-ary communication data is employed in which the data consists of N sequential symbols $r_1 \ldots r_N$, each having one of M transmitted phases. Selected sequences of N−1 elements that represent possible sequences of phase differentials are evaluated using multiple-symbol differential detection. Using $r_1$ as the reference for each phase differential estimate, $s^{N-1}$ phase differential sequences are selected in the form $(P_{2i}, P_{3i}, \ldots, P_{Ni})$ for $i=1$ to s for evaluating said symbol set, where s is predetermined and $1 < s < M$. Each set of s phase differential estimate values are chosen based on being the closest in value to the actual transmitted phase differential value. These s phase differential estimates can be determined mathematically as those which produce the maximum results using conventional differential detection.

6 Claims, 8 Drawing Sheets

OTHER PUBLICATIONS

Divsalar et al., "Multiple-Symbol Differential Detection on MPSK," IEEE Transactions on Communications, vol. 38, No. 3, pp. 300-308, Mar. 1990.

Li et al., "Multiple-Symbol Detection for Orthogonal Modulation in CDMA System," IEEE Transactions on Vehicular Technology, vol. 50, No. 1, pp. 321-325, Jan. 2001.

* cited by examiner

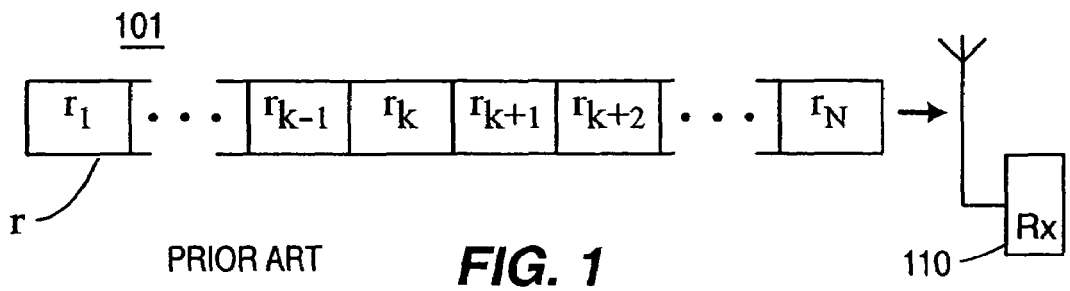
PRIOR ART  FIG. 1
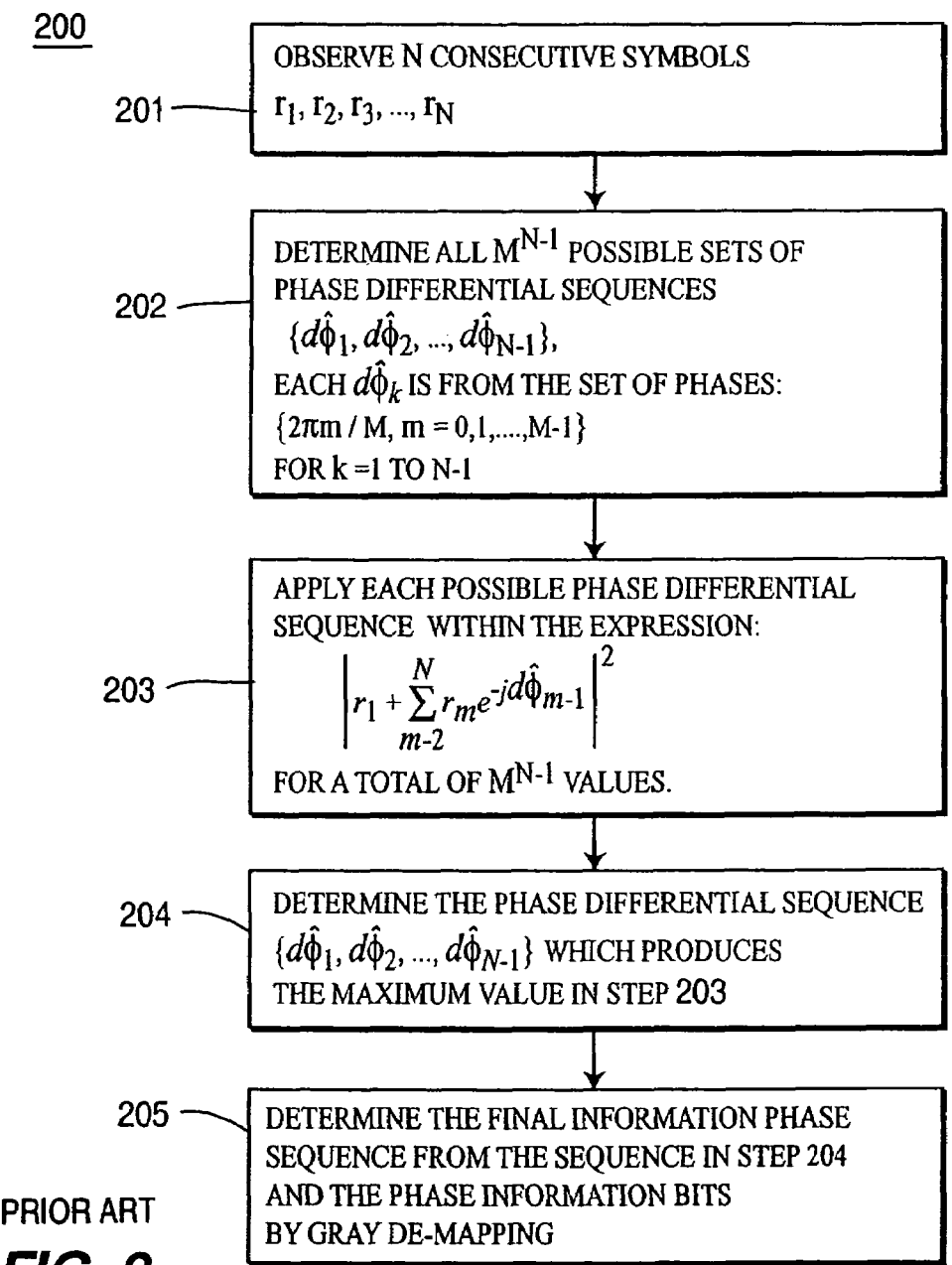
PRIOR ART
FIG. 2

PHASE COMBINATIONS FOR N=4, M=4

| | | | |
|---|---|---|---|
| (0, 0, 0) | (0, 0, π/2) | (0, 0, π) | (0, 0, 3π/2) |
| (0, π/2, 0) | (0, π/2, π/2) | (0, π/2, π) | (0, π/2, 3π/2) |
| (0, π, 0) | (0, π, π/2) | (0, π, π) | (0, π, 3π/2) |
| (0, 3π/2, 0) | (0, 3π/2, π/2) | (0, 3π/2, π) | (0, 3π/2, 3π/2) |
| (π/2, 0, 0) | (π/2, 0, π/2) | (π/2, 0, π) | (π/2, 0, 3π/2) |
| (π/2, π/2, 0) | (π/2, π/2, π/2) | (π/2, π/2, π) | (π/2, π/2, 3π/2) |
| (π/2, π, 0) | (π/2, π, π/2) | (π/2, π, π) | (π/2, π, 3π/2) |
| (π/2, 3π/2, 0) | (π/2, 3π/2, π/2) | (π/2, 3π/2, π) | (π/2, 3π/2, 3π/2) |
| (π, 0, 0) | (π, 0, π/2) | (π, 0, π) | (π, 0, 3π/2) |
| (π, π/2, 0) | (π, π/2, π/2) | (π, π/2, π) | (π, π/2, 3π/2) |
| (π, π, 0) | (π, π, π/2) | (π, π, π) | (π, π, 3π/2) |
| (π, 3π/2, 0) | (π, 3π/2, π/2) | (π, 3π/2, π) | (π, 3π/2, 3π/2) |
| (3π/2, 0, 0) | (3π/2, 0, π/2) | (3π/2, 0, π) | (3π/2, 0, 3π/2) |
| (3π/2, π/2, 0) | (3π/2, π/2, π/2) | (3π/2, π/2, π) | (3π/2, π/2, 3π/2) |
| (3π/2, π, 0) | (3π/2, π, π/2) | (3π/2, π, π) | (3π/2, π, 3π/2) |
| (3π/2, 3π/2, 0) | (3π/2, 3π/2, π/2) | (3π/2, 3π/2, π) | (3π/2, 3π/2, 3π/2) |

FIG. 5

PRIOR ART

ALGORITHM FOR MULTIPLE-SYMBOL DIFFERENTIAL DETECTION

CROSS REFERENCE TO RELATED APPLICATION(S)

This application is a continuation of U.S. patent application Ser. No. 10/279,238, filed Oct. 24, 2002.

FIELD OF THE INVENTION

This invention relates to differential detection of multiple-phase shift keying (MPSK) modulation in communication systems. This invention generally relates to digital communications, including, but not limited to CDMA systems.

BACKGROUND OF THE INVENTION

Conventionally, communication receivers use two types of MPSK modulated signal detection: coherent detection and differential detection. In coherent detection, a carrier phase reference is detected at the receiver, against which subsequent symbol phases are compared to estimate the actual information phase. Differential detection processes the difference between the received phases of two consecutive symbols to determine the actual phase. The reference phase is the phase of the first of the two consecutive symbols, against which the difference is taken. Although differential detection eliminates the need for carrier phase reference processing in the receiver, it requires a higher signal-to-noise ratio at a given symbol error rate.

Differential detection in an Additive White Gaussian Noise (AWGN) channel is preferred over coherent detection when simplicity of implementation and robustness take precedence over receiver sensitivity performance. Differential detection is also preferred when it is difficult to generate a coherent demodulation reference signal. For differential detection of multiple-phase shift keying (MPSK) modulation, the input phase information is differentially encoded at the transmitter, then demodulation is implemented by comparing the received phase between consecutive symbol intervals. Therefore, for proper operation, the received carrier reference phase should be constant over at least two symbol intervals.

Multiple-symbol differential detection (MSDD) uses more than two consecutive symbols and can provide better error rate performance than conventional differential detection (DD) using only two consecutive symbols. As in the case of DD, MSDD requires that the received carrier reference phase be constant over the consecutive symbol intervals used in the process.

Detailed discussions of MSDD and Multiple Symbol Detection (MSD) are found in, "Multiple-Symbol Differential Detection of MPSK" (Divsalar et al., IEEE TRANSACTIONS ON COMMUNICATIONS, Vol. 38, No. 3, March 1990) and "Multiple-Symbol Detection for Orthogonal Modulation in CDMA System" (Li et al., IEEE TRANSACTIONS ON VEHICULAR TECHNOLOGY, Vol. 50, No. 1, January 2001).

Conventional MPSK MSDD is explained in conjunction with FIGS. 1 and 2 below. FIG. 1 shows an AWGN communication channel 101 with an MPSK signal sequence r that comprises N consecutive symbols $r_1 \ldots r_N$ received by receiver 110. Symbol $r_k$ represents the $k^{th}$ component of the N length sequence r, where $1 \leq k \leq N$.

The value for $r_k$ is a vector represented by Equation (1):

$$r_k = \sqrt{\frac{2E_s}{T_s}} e^{j\phi_k + j\theta_k} + n_k \qquad \text{Eq. (1)}$$

having symbol energy $E_S$, symbol interval $T_S$ and transmitted phase $\phi_k$ where $j=\sqrt{-1}$. Value $n_k$ is a sample taken from a stationary complex white Gaussian noise process with zero mean. Value $\theta_k$ is an arbitrary random channel phase shift introduced by the channel and is assumed to be uniformly distributed in the interval $(-\pi, \pi)$. Although channel phase shift $\theta_k$ is unknown, differential detection conventionally operates assuming $\theta_k$ is constant across the interval of observed symbols $r_1$ to $r_N$. For differential MPSK (DMPSK), phase information is differentially encoded at the transmitter, and transmitted phase $\phi_k$ is represented by:

$$\phi_k = \phi_{k-1} + \Delta\phi_k \qquad \text{Eq. (2)}$$

where $\Delta\phi_k$ is the transmitted information phase differential corresponding to the $k^{th}$ transmission interval that takes on one of M uniformly distributed values within the set $\Omega=\{2\pi m/M, m=0, 1, \ldots, M-1\}$ around the unit circle, as in a Gray mapping scheme. For example, for QPSK, M=4 and $\Delta\phi_k=0, \pi/2, \pi,$ or $3\pi/2$ for each k from 1 to N.

It is assumed for simplicity that arbitrary phase value $\theta_k$ is constant ($\theta_k=\theta$) over the N-length of the observed sequence.

At the receiver, optimum detection using multiple-symbol differential detection (MSDD) is achieved by selecting an estimated sequence of phase differentials $\{d\hat{\phi}_1, d\hat{\phi}_2, \ldots, d\hat{\phi}_{N-1}\}$ which maximizes the following decision statistic:

$$\eta = \max_{d\hat{\phi}_1, d\hat{\phi}_2, \ldots, d\hat{\phi}_{N-1} \in \Omega} \left| r_1 + \sum_{m=2}^{N} r_m e^{-jd\hat{\phi}_{m-1}} \right|^2 \qquad \text{Eq. (3)}$$

By Equation (3), the received signal is observed over N symbol time intervals while simultaneously selecting the optimum estimated phase sequence $\{d\hat{\phi}_1, d\hat{\phi}_2, \ldots, d\hat{\phi}_{N-1}\}$. The maximized vector sum of the N-length signal sequence $r_k$, provides the maximum-likelihood detection, where estimated phase differential $d\hat{\phi}_m$ is the difference between estimated phase $\hat{\phi}_{m+1}$ and the estimate of the first phase $\hat{\phi}_1$.

$$d\hat{\phi}_m = \hat{\phi}_{m+1} - \hat{\phi}_1. \qquad \text{Eq. (4)}$$

The estimate of transmitted information phase sequence $\{\Delta\hat{\phi}_1, \Delta\hat{\phi}_2, \ldots, \Delta\hat{\phi}_{N-1}\}$ is obtained from the estimated phase sequence $\{d\hat{\phi}_1, d\hat{\phi}_2, \ldots, d\hat{\phi}_{N-1}\}$ using Equation (5).

$$d\hat{\phi}_m = \sum_{k=1}^{m} \Delta\hat{\phi}_k \qquad \text{Eq. (5)}$$

Value $\Delta\hat{\phi}_k$ is an estimate of transmitted phase differential $\Delta\phi_k$. Since $d\hat{\phi}_k$ ($1 \leq k \leq N-1$) takes on one of M uniformly distributed $\Omega$ values $\{2\pi m/M, m=0, 1, \ldots, M-1\}$, the conventional MSDD detection searches all possible phase differential sequences and there are $M^{N-1}$ such phases. The error rate performance improves by increasing the observed sequence length N, which preferably is selected to be N=4 or N=5. As an example, for 16PSK modulation with N=5, the number of phase differential sequences to search is $16^4=65536$. As evident by this considerably large number of sequences, simplicity in the search sequence is sacrificed in order to achieve a desirable error rate performance.

FIG. 2 shows the process flow diagram for algorithm 200, which performs conventional MSDD. It begins with step 201 where N consecutive symbols $r_k$ for k=1 to N are observed. Next, the possible sets of phase differential sequences $\{d\hat{\phi}_1, d\hat{\phi}_2, \ldots, d\hat{\phi}_{N-1}\}$ where each $d\hat{\phi}_k$, for k=1 to N−1, is one from the set of M uniformly distributed phase values in the set $\Omega=\{2\pi m/M, m=0, 1, \ldots, M-1\}$. There are $M^{N-1}$ possible sets. FIG. 5 shows an example of an array of such sets, where N=4 and M=4, which illustrates the $4^{4-1}=64$ possible sets of phase differential sequences. In step 203, each possible phase sequence is attempted in the expression $$\left| r_1 + \sum_{m=2}^{N} r_m e^{-jd\hat{\phi}_{m-1}} \right|^2,$$

giving a total of $M^{N-1}$ values. Next, in step 204, the maximum value is found for step 203, which indicates the best estimate phase differential sequence. Finally, in step 205, the final information phase sequence $\{\Delta\hat{\phi}_1, \Delta\hat{\phi}_2, \ldots, \Delta\hat{\phi}_{N-1}\}$ is estimated from $\{d\hat{\phi}_1, d\hat{\phi}_2, \ldots, d\hat{\phi}_{N-1}\}$ using Equation (5) and the information bits are obtained from Gray de-mapping between phase and bits.

Although MSDD provides much better error performance than conventional DD (symbol-by-symbol), MSDD complexity is significantly greater. Therefore, it is desirable to provide an improved method and system for MSDD with less complexity.

SUMMARY

A method for multiple-symbol differential detection phase evaluation of M-ary communication data is employed in which the data consists of N sequential symbols $r_1 \ldots r_N$, each having one of M transmitted phases. Selected sequences of N−1 elements that represent possible sequences of phase differentials are evaluated using multiple-symbol differential detection. Next, using $r_1$ as the reference for each phase differential estimate, $s^{N-1}$ phase differential sequences are selected in the form $(P_{2i}, P_{3i}, \ldots, P_{Ni})$ for i=1 to s for evaluating said symbol set, where s is predetermined and 1<s<M. Rather than attempting every one of the M possible phase differential values during the estimation, the reduced subset of s phase differential estimate values are chosen based on being the closest in value to the actual transmitted phase differential value. These s phase differential estimates can be determined mathematically as those which produce the maximum results in the differential detection expression $|r_1+r_{k+1}e^{-j\beta_k}|^2$.

Each of the $s^{N-1}$ phase differential sequences are then evaluated using MSDD to determine the final maximum likelihood phase sequence. The resulting final phase sequence can be used to determine the information phase estimates and the phase information bits by Gray de-mapping.

BRIEF DESCRIPTION OF THE DRAWINGS

FIG. 1 shows a representation of a channel symbol stream for a receiver.

FIG. 2 shows a process flow diagram of an algorithm 200 for conventional MSDD.

FIG. 5 shows a table of possible phase sequences processed by a conventional MSDD algorithm.

DESCRIPTION OF THE PREFERRED EMBODIMENTS

Figure 3A:
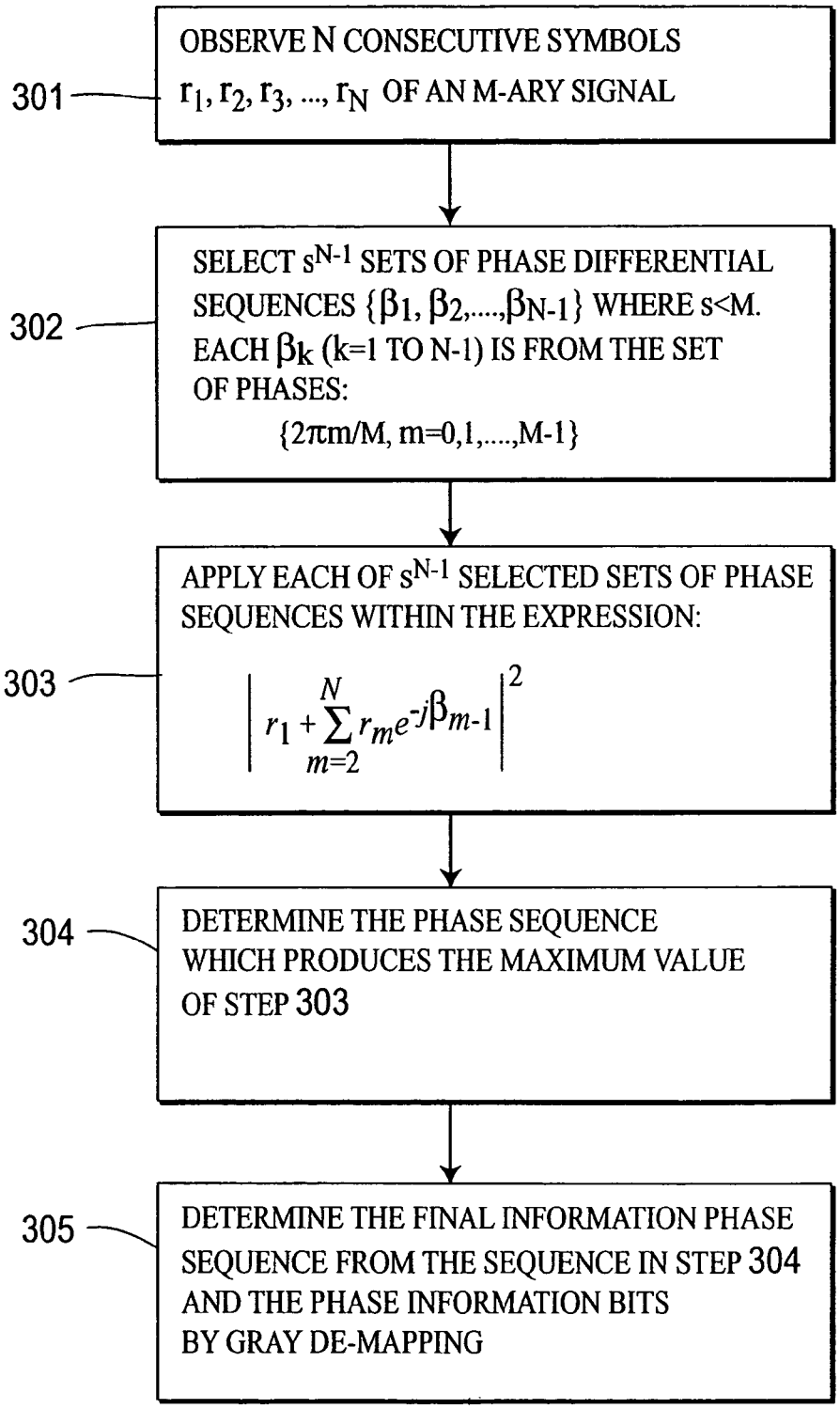
FIG. 3A shows a process flow diagram of an algorithm 300 for reduced complexity MSDD.
Figure 3B:
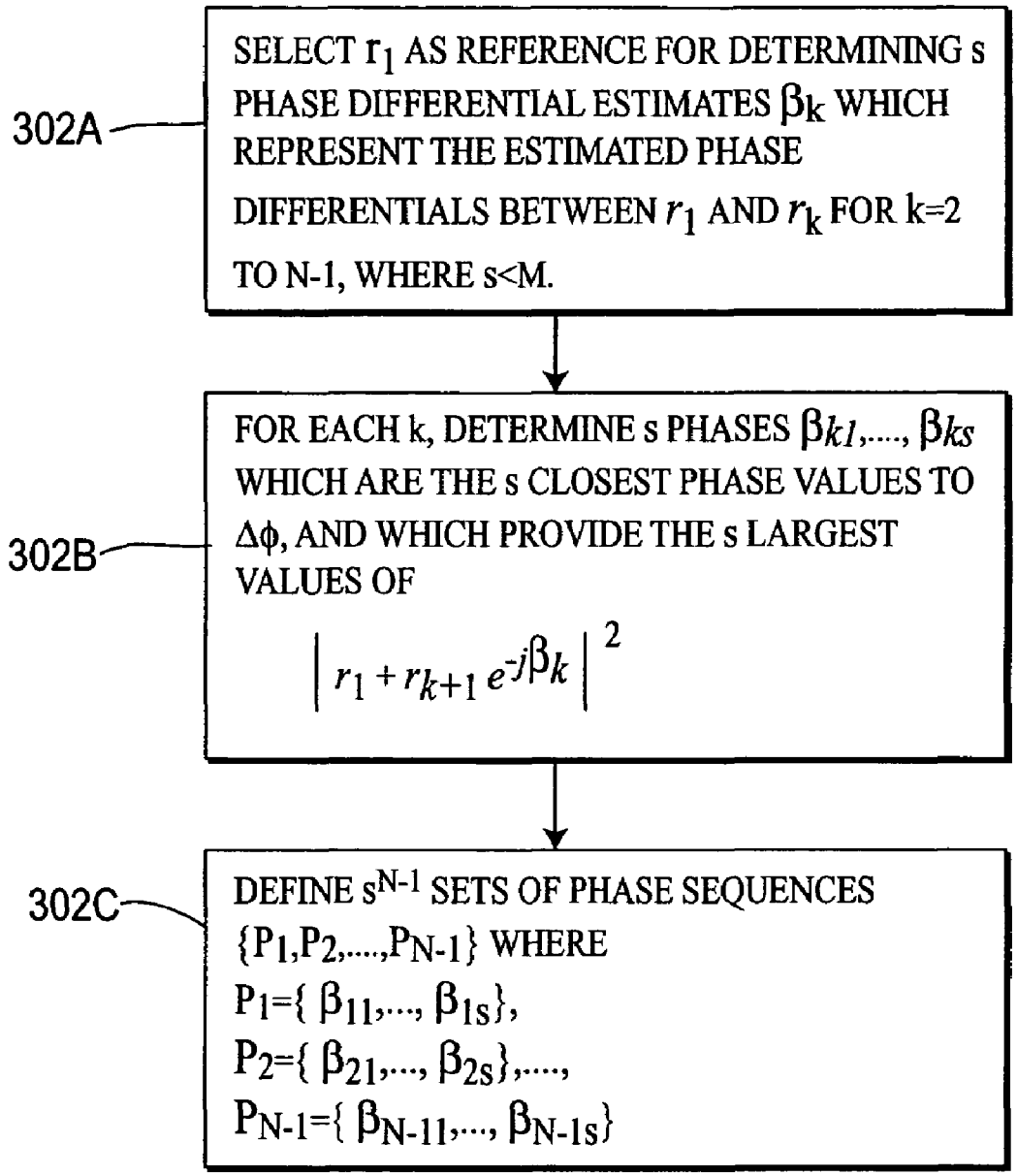
FIG. 3B shows a detailed process flow diagram for step 302 of FIG. 3A.

FIG. 3A shows a MSDD algorithm 300 that reduces the search complexity of the MSDD of algorithm 200, using a subset search concept. First, instep 301, N consecutive symbols $r_k$ are observed for $1 \leq k \leq N-1$. In step 302, $s^{N-1}$ sets of phase differential estimate sequences $\{\beta_1, \beta_2, \ldots, \beta_{N-1}\}$ are selected as optimum estimates from among the full set of $M^{N-1}$ phase estimates attempted in algorithm 200. Turning to FIG. 3B, step 302 is broken down in further detail. In step 302A, the initial received signal $r_1$ is selected as a preferred reference for determining phase differentials between $r_1$ and each subsequent $r_k$. In step 302B, a small candidate subset of s phase differential estimates $\{\beta_{k1}, \beta_{k2}, \ldots \beta_{ks}\}$ ($1 \leq k \leq N-1$), among all M possible phases $\{2\pi m/M, m=0, 1, \ldots, M-1\}$ where 1<s<M and s is predetermined. The s phase estimates that are selected are the closest in value to the actual phase differential $\Delta\phi_k$. In order to obtain the closest values for the phase differential estimates, each $\beta_k$ is applied to the conventional DD expression $|r_1+r_{k+1}e^{-j\beta_k}|^2$ from which the s phase differential estimates $\{\beta_{k1}, \beta_{k2}, \ldots \beta_{ks}\}$ that produce the maximum resulting value are selected. With the inclusion of this symbol-by-symbol DD process step (302B), it can be seen that algorithm 300 is a combination of MSDD and DD processing. In step 302C, there are now $s^{N-1}$ sets of optimum phase differential sequences, where $P_k=\{\beta_{k1}, \beta_{k2}, \ldots \beta_{ks}\}$. Returning to FIG. 3A, the result of step 302 is $s^{N-1}$ sequences of phases $(P_1, P_2, \ldots, P_{N-1})$. These are the maximum-likelihood phase differential candidates. That is, the s values for $P_1$ are the closest in value to the actual phase differential $\Delta\phi_1$, the s values for $P_2$ are the closest to actual phase differential $\Delta\phi_2$, and so on.

In step 303, all $s^{N-1}$ possible phase sequences $(P_1, P_2, \ldots, P_{N-1})$ are attempted within the expression $$\left| r_1 + \sum_{m=2}^{N} r_m e^{-j\beta_{m-1}} \right|^2.$$

These sets of phase candidates are significantly reduced in number compared with algorithm 200 since s<M and $s^{N-1}<M^{N-1}$. When s is very small, the number of phase differential sequences to search becomes much smaller, which leads to significant complexity savings. As an example, for s=2, N=4 and M=4, there will be eight (8) sets of phase differential sequences that will result. This is a much smaller subset of the sixty-four (64) phase differential sequences shown in FIG. 5, which would be processed in a conventional MSDD algorithm, such as algorithm 200.

In step 304, the maximum resulting vectors from step 303 determine the optimum phase differential sequence $\{\beta_1,$ $\beta_2, \ldots, \beta_{N-1}\}$. Steps 303 and 304 in combination can be expressed by the following decision statistic:

$$\eta^{new} = \max_{\beta_1 \in P_1, \ldots, \beta_{N-1} \in P_{N-1}} \left| r_1 + \sum_{m=2}^{N} r_m e^{-j\beta_{m-1}} \right|^2 \quad \text{Eq. (6)}$$

When s=M, the statistic is simply $\eta^{new}=\eta$.

In step 305, the final information phase sequence $\{\Delta\hat{\phi}_1, \Delta\hat{\phi}_2, \ldots \Delta\hat{\phi}_{N-1}\}$ is estimated from the optimum phase differential sequence $\{\beta_1, \beta_2, \ldots \beta_{N-1}\}$ using Equation (7) and the phase information bits are obtained by Gray de-mapping.

$$\beta_m = \sum_{k=1}^{m} \Delta\hat{\phi}_k \quad \text{Eq. (7)}$$

Figure 4A:
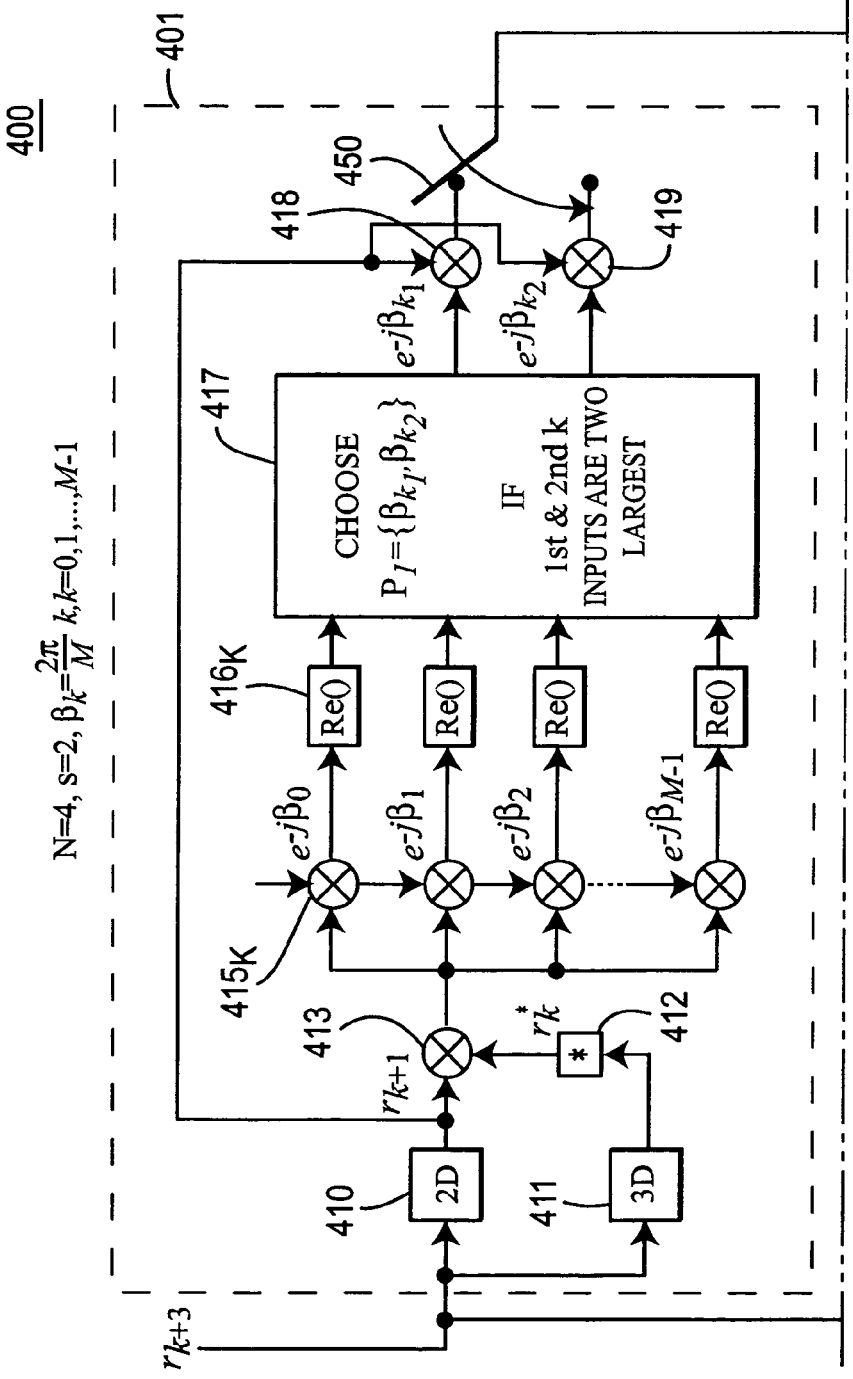
FIGS. 4A, 4B, 4C show a block diagram of an implementation of the reduced complexity MSDD algorithm.
Figure 4B:
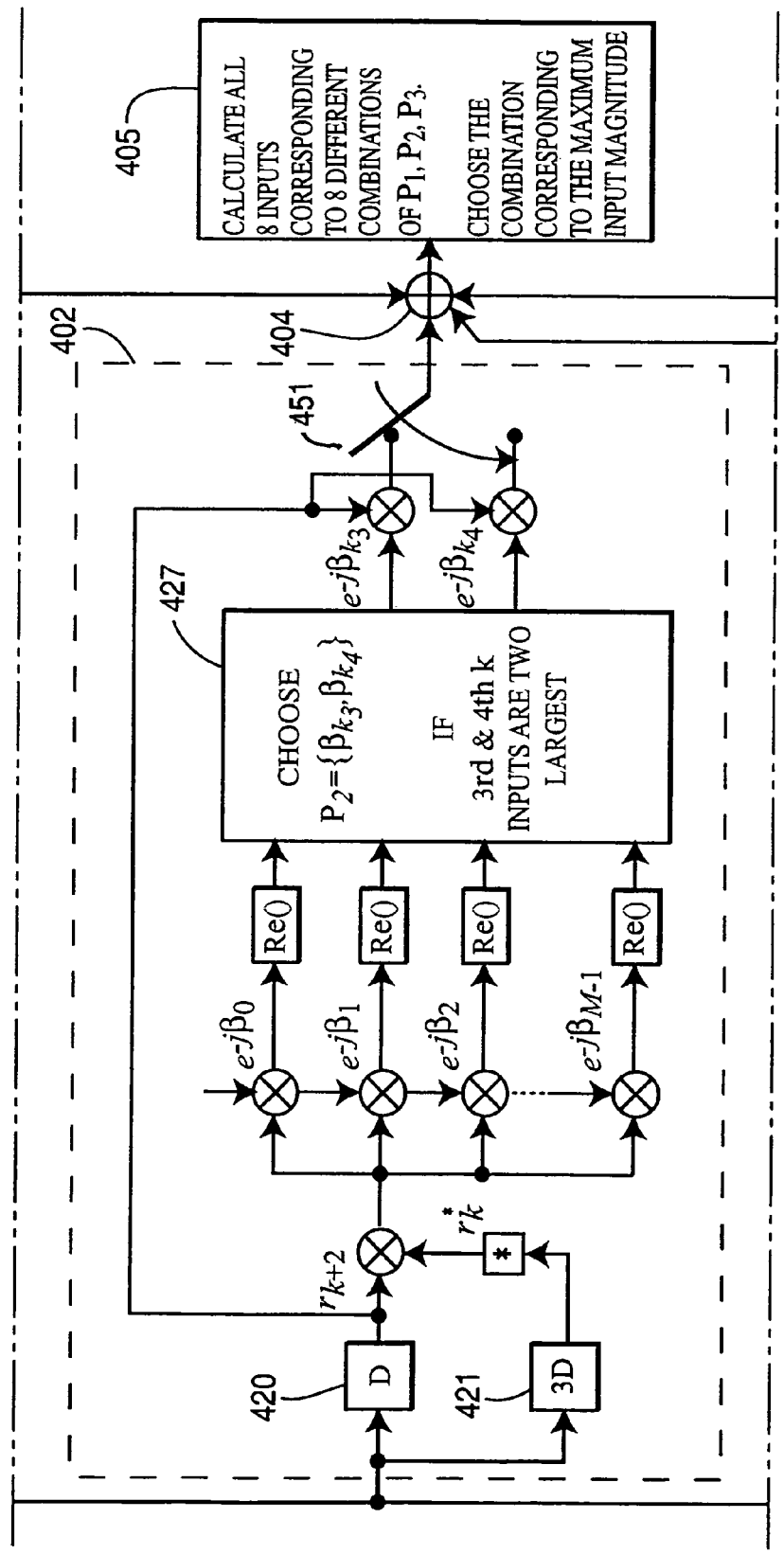
Figure 4C:
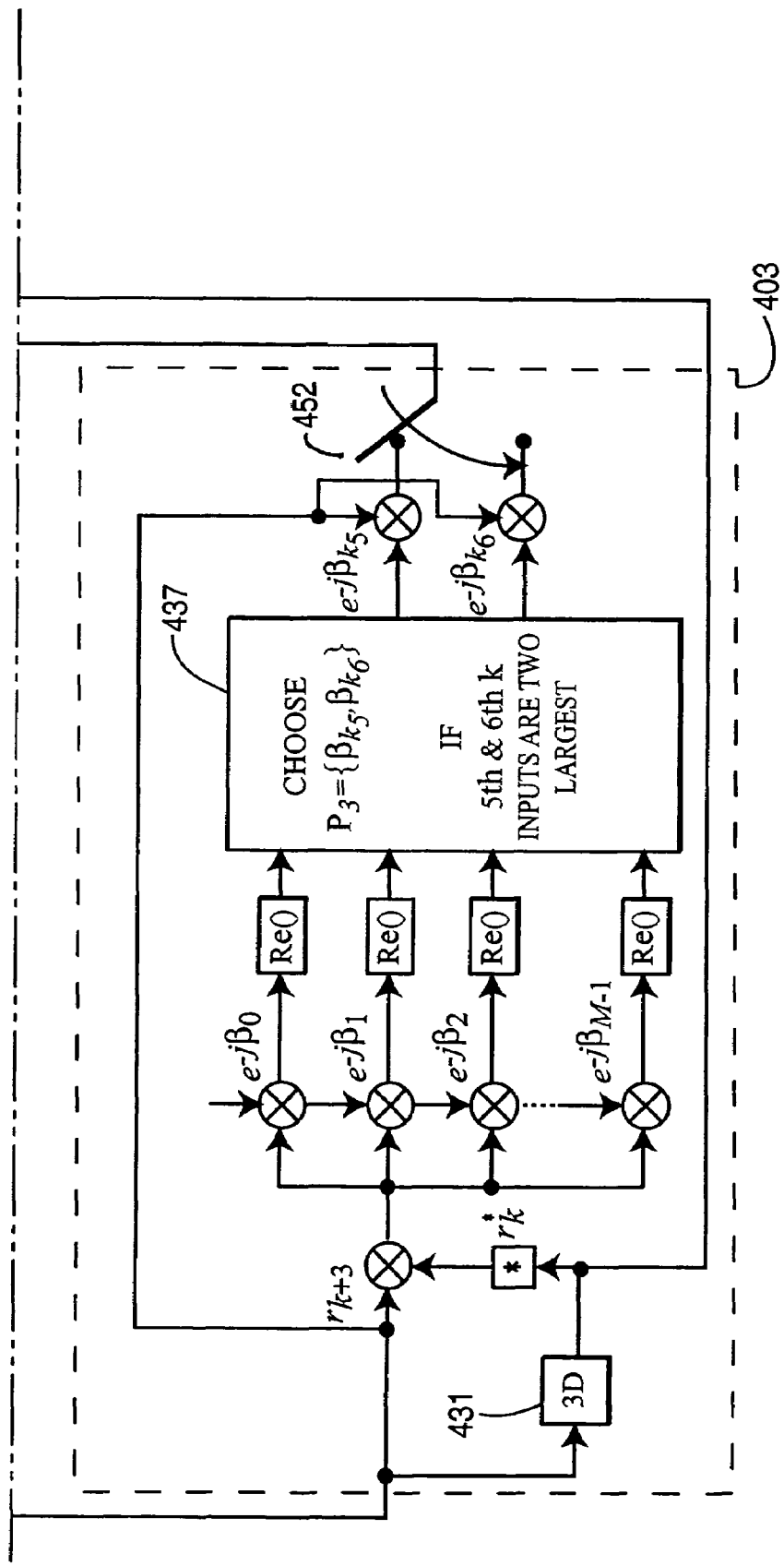

FIG. 4 shows a block diagram of MSDD parallel implementation 400, where N=4, s=2. Since N=4, there are N−1=3 parallel selection circuits 401, 402, 403, for determining $s^{N-1}$ (i.e., 8) subsets ($P_1, P_2, P_3$) of candidate phases. Selection circuit 401 comprises delay blocks 410, 411; conjugator 412, multiplier 413, multiplier $415_k$ (k=0 to N−1), amplitude blocks $416_k$ (k=0 to N−1), decision block 417 multipliers 418, 419 and switch 450. Input symbol $r_{k+3}$ passes through delays 410, 411 for establishing $r_k$ as the reference symbol and $r_{k+1}$ as the consecutive symbol against which the phase differential is to be estimated. The output of conjugator 412 produces conjugate $r_k^*$, which when multiplied with consecutive symbol $r_{k+1}$ by multiplier 413, produces a phase difference value. Next, the phase difference is multiplied by multipliers $415_k$ to each phase in the set $\beta_k$, where $\beta_k=(2\pi k/M, k=0, 1, \ldots, M-1)$. Next, the products are passed through amplitude blocks $415_k$ and input to decision block 417, which selects the maximum s=2 inputs for the subset $P_1=[\beta_{k1}, \beta_{k2}]$. The outputs of block 401 are the products $r_{k+1}e^{-j\beta_{k1}}$ and $r_{k+1}e^{-j\beta_{k2}}$ output by multipliers 418, 419.

Decision circuits 402 and 403 comprise parallel sets of similar elements as described for block 401. Decision circuit 402 includes delay blocks 420, 421, which allow processing of reference symbol $r_k$ with $r_{k+2}$, whereby decision block 427 chooses candidate phases $P_2=[\beta_{k3}, \beta_{k4}]$. Likewise, block 403 includes delay block 431 to allow decision block 437 to select phase differential candidates $P_3=[\beta_{k5}, \beta_{k6}]$ for reference symbol $r_k$ and symbol $r_{k+3}$. Summer 404 adds alternating combinations of outputs from blocks 401, 402 and 403 alternated by switches 450, 451, 452, respectively, plus reference symbol $r_k$. Since s=2, there are $2^3=8$ combinations of phase differential sequence ($P_1, P_2, P_3$) produced by switches 450, 451, 452. Decision block 405 selects the optimum phase differential sequence $\{\beta_1, \beta_2, \beta_3\}$, which is the phase differential sequence ($P_1, P_2, P_3$) that produces the maximum sum.

Figure 6:
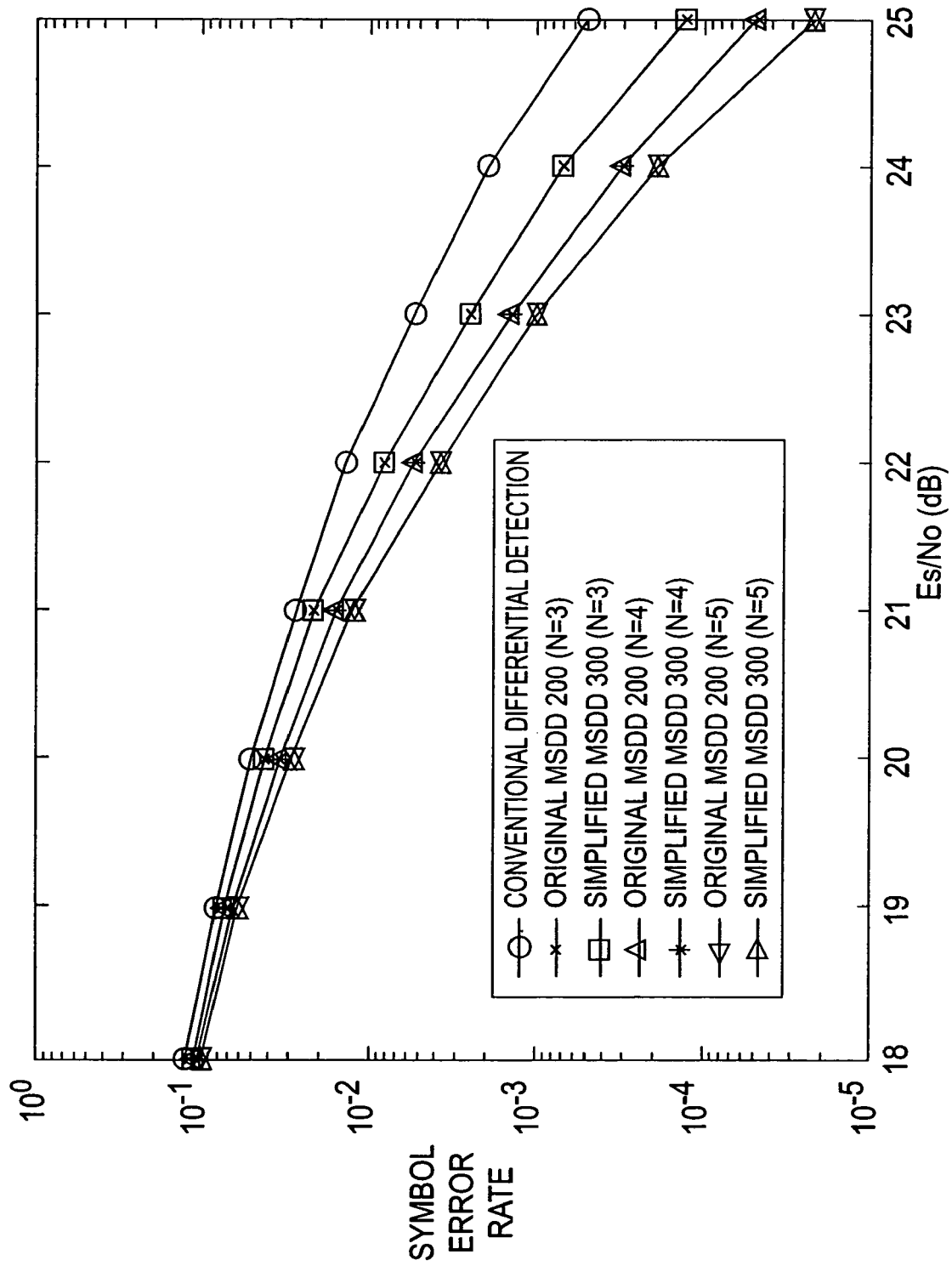
FIG. 6 graphically shows a comparison of the symbol error rate performances for the conventional and simplified MSDD algorithms.

FIG. 6 shows the symbol error rate (SER) performance of the MSDD algorithm for 16PSK, where s=2 for different symbol observation lengths N=3, 4 and 5. As shown in FIG. 6, reduced-complexity MSDD algorithm 300 with s=2 provides almost the same performance as the original MSDD algorithm 200 where s=M. This is because the MSDD algorithm 300 selects one of the two closest phases between the vector $r_{k+1}e^{-j\beta_k}$ ($1 \leq k \leq N-1$) and $r_1$ in order to maximize the statistic of Equation (6). Therefore, for 2<s<M, the performance is essentially the same as for s=2, which means there is no benefit to increasing the complexity of algorithm 300 to s>2.

Therefore, the optimum results are gained using the simplest possible choice for s, that is s=2.

Table 1 shows the complexity comparison of algorithm 300 with s=2 for symbol observation length N=5 against algorithm 200. The number of phase differential sequences to search is reduced significantly, resulting in faster processing speeds.

TABLE 1

| M | Modulation | No. of phase differential sequences to search for MSDD 200 ($M^{N-1}$) | No. of phase differential sequences to search for MSDD 300 ($S^{N-1}$) | Reduction factor | Speed factor (x times faster) |
|---|---|---|---|---|---|
| 4 | 4PSK | 256 | 16 | 16 | 12 |
| 8 | 8PSK | 4096 | 16 | 256 | 229 |
| 16 | 16PSK | 65536 | 16 | 4096 | 3667 |

What is claimed is:

1. A method for multiple-symbol differential detection phase evaluation of MPSK communication data comprising the steps:

a) observing a received set of N sequential symbols $r_1$ to $r_N$, each pair of consecutive symbols having a phase differential from among M phases where M>2;

b) evaluating the set of symbols $r_1$ to $r_N$ based on selected sequences of N−1 elements that represent possible sequences of phase differentials selected from the set ($2\pi k/M$, k=0, 1, ..., M−1);

c) selecting $S^{N-1}$ candidate phase sequences of the form ($P_{2i}, P_{3i}, \ldots, P_{Ni}$) for i=1 to S for evaluating said symbol set, where 1<S<M, and wherein S candidate phases $\beta_{k1}$ to $\beta_{ks}$ of the M phases for each k that are closest to the actual phase differential are selected from the set ($2\pi k/M$, k=0, 1, ..., M−1), which produce the S largest values using the expression $|r_1+r_{k+1}e^{-j\beta_k}|^2$, resulting in N−1 sets of S phases;

d) determining the optimum phase differential sequence from among the candidate phase sequences.

2. The method of claim 1 wherein evaluating in step (b) further includes estimating a phase differential between the first symbol $r_1$ and each other symbol $r_k$ (k=2 to N); and wherein the determining in step (d) determines an optimum phase differential sequence ($\beta_1, \beta_2, \ldots, \beta_{N-1}$) by attempting the $S^{N-1}$ phase sequences from step (c) in the expression $$\left| r_1 + \sum_{m=2}^{N} r_m e^{-j\beta_{m-1}} \right|^2$$

and choosing the phase sequence that produces the maximum result.

3. The method of claim 2, further comprising:

e) determining an estimate of a transmitted information phase differential sequence from the optimum phase differential sequence of step (d); and f) determining phase information bits by Gray de-mapping.

4. The method of claim 3, wherein step (e) further comprises: calculating the estimate using the relationship $$\beta_m = \sum_{k=1}^{m} \Delta \hat{\phi}_k$$

where $\beta_m$ (m=1 to N−1) represents the optimum phase differential sequence of step (d) and $\Delta \hat{\phi}_k$ represents estimated the transmitted information phase differential sequence.

5. The method of claim 2, wherein S=2 and the two closest phases are determined.

6. The method of claim 2, wherein M=4, N=4 and S=2, said phases $\beta_{k1}$ to $\beta_{ks}$ are selected from the set $(0, \pi/2, \pi, 3\pi/2)$, to produce $S^{N-1}$ phase sets:

($P_{21}$, $P_{31}$, $P_{41}$)
($P_{21}$, $P_{31}$, $P_{42}$)
($P_{21}$, $P_{32}$, $P_{41}$)
($P_{21}$, $P_{32}$, $P_{42}$)
($P_{22}$, $P_{31}$, $P_{41}$)
($P_{22}$, $P_{31}$, $P_{42}$)
($P_{22}$, $P_{32}$, $P_{41}$)
($P_{22}$, $P_{32}$, $P_{42}$).

* * * * *

UNITED STATES PATENT AND TRADEMARK OFFICE
CERTIFICATE OF CORRECTION

PATENT NO. : 7,440,519 B2 Page 1 of 1
APPLICATION NO. : 11/015220
DATED : October 21, 2009
INVENTOR(S) : Li et al.

It is certified that error appears in the above-identified patent and that said Letters Patent is hereby corrected as shown below:

ON THE TITLE PAGE

At item (56), U.S. PATENT DOCUMENTS, page 1, left column, delete line beginning with "5,644,592" and insert therefor --5,644,592 A 7/1997 Divsalar et al.--.

At item (56), OTHER PUBLICATIONS, page 1, right column, line 4, after the word "Detection" delete "of" and insert therefor --on--.

At column 4, line 17, after the word "shows" delete "a" and insert therefor --an--.

At column 4, line 19, after the word "First" delete "instep" and insert therefor --in step--.

At column 5, line 12, before the words "is estimated" delete " $\Delta\hat{\phi}_2, \ldots, \Delta\hat{}_{N-1}\}$ " and insert therefor -- $\Delta\hat{\phi}_2, \ldots, \Delta\hat{\phi}_{N-1}\}$ --.

At claim 4, column 7, line 10, after the word "represents" delete "estimated the" and insert therefor --the estimated--.

Signed and Sealed this

Twenty-fourth Day of March, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,440,519 B2
APPLICATION NO. : 11/015220
DATED : October 21, 2008
INVENTOR(S) : Li et al.

It is certified that error appears in the above-identified patent and that said Letters Patent is hereby corrected as shown below:

ON THE TITLE PAGE

At item (56), U.S. PATENT DOCUMENTS, page 1, left column, delete line beginning with "5,644,592" and insert therefor --5,644,592 A 7/1997 Divsalar et al.--.

At item (56), OTHER PUBLICATIONS, page 1, right column, line 4, after the word "Detection" delete "of" and insert therefor --on--.

At column 4, line 17, after the word "shows" delete "a" and insert therefor --an--.

At column 4, line 19, after the word "First" delete "instep" and insert therefor --in step--.

At column 5, line 12, before the words "is estimated" delete " $\Delta\hat{\phi}_2, \ldots, \Delta\hat{}_{N-1}\}$ " and insert therefor -- $\Delta\hat{\phi}_2, \ldots, \Delta\hat{\phi}_{N-1}\}$ --.

At claim 4, column 7, line 10, after the word "represents" delete "estimated the" and insert therefor --the estimated--.

This certificate supersedes the Certificate of Correction issued March 24, 2009.

Signed and Sealed this

Fourteenth Day of April, 2009

JOHN DOLL
*Acting Director of the United States Patent and Trademark Office*